United States Patent [19]

Frederick

[11] 4,320,872

[45] Mar. 23, 1982

[54] ANTI-ICE CONTROL SYSTEM

[75] Inventor: Gary L. Frederick, Tempe, Ariz.

[73] Assignee: The Garrett Corporation, Los Angeles, Calif.

[21] Appl. No.: 91,028

[22] Filed: Nov. 5, 1979

[51] Int. Cl.³ .......................................... G05D 23/02
[52] U.S. Cl. .................................. 236/80 A; 165/28; 236/80 C; 236/87
[58] Field of Search ..................... 236/87, 80 C, 80 A, 236/86, 91 F, 49; 165/28; 237/123 B

[56] References Cited

U.S. PATENT DOCUMENTS

| | | | |
|---|---|---|---|
| 1,751,806 | 3/1930 | Fleisher | 165/28 X |
| 2,266,202 | 12/1941 | Heinkel | 236/91 F |
| 2,318,706 | 5/1943 | Newton | 165/28 X |
| 2,407,036 | 9/1946 | Snavely | 165/28 X |
| 2,494,624 | 1/1950 | Lehane | 165/28 |
| 2,553,262 | 5/1951 | Lehane et al. | 165/28 X |
| 3,373,934 | 3/1968 | Kolbe et al. | 236/86 X |
| 3,809,314 | 5/1974 | Engelke et al. | 236/82 X |
| 4,094,463 | 6/1978 | Milewski | 236/87 X |

*Primary Examiner*—William E. Tapolcai, Jr.
*Attorney, Agent, or Firm*—Stuart O. Lowry; J. Richard Konneker; Albert J. Miller

[57] ABSTRACT

An anti-ice control system for controlling flow of heated air in response to the temperature of the heated air and ambient air.

46 Claims, 3 Drawing Figures

4,320,872

ANTI-ICE CONTROL SYSTEM

BACKGROUND OF THE INVENTION

This invention relates to anti-ice systems particularly of the type used for preventing icing of structural components in aircraft. More specifically, the invention relates to an improved anti-ice system for optimizing the flow of heated air to aircraft components during icing conditions.

Icing of aerodynamic structural components such as wings comprises a major problem in the operation of aircraft in cold weather conditions. Accordingly, to prevent icing of these structural components, it is well known to provide a source of heated air for circulation to the component subject to icing. The heated air sufficiently elevates the surface temperature of the structural component so as to prevent the formation of ice thereon.

Various anti-ice control systems have been devised in the prior art for providing a supply of heated air to aircraft structural components subject to icing. Among the more effective of these systems comprises an auxiliary combustion heater, such as that shown and described in British Pat. No. 673,961. However, combustion heaters consume fuel from the aircraft main engine fuel system, and present problems such as increased weight, complexity, fire hazard, and carbon monoxide poisoning.

In turbine engine-powered aircraft, it is known to bleed off a portion of the hot compressed air output of the engine compressor, and to supply this so-called bleed air to the structural components to prevent the formation of ice. However, uncontrolled supply of the bleed air to the structural components reduces the quantity of hot compressed air available for supply to the engine, and thereby has a detrimental effect upon engine performance. Accordingly, various bleed air systems have been proposed to control the supply of bleed air to these structural components. Some of these systems comprise, for example, a manually operated control such as that disclosed in U.S. Pat. No. 3,258,229. Other bleed air systems have controlled the quantity of bleed air in response to the pressure of the bleed air, or in response to the temperature of the bleed air, or in response to a combination of these parameters. See, for example, U.S. Pat. Nos. 3,058,695; 3,749,336; 2,563,054; 3,057,154; 2,648,193; and 2,868,483. However, these prior art systems have not satisfactorily optimized the control of the bleed air supply so that a minimum quantity of bleed air sufficient for preventing the formation of ice is supplied to the structural components.

The invention of this application overcomes the problems and disadvantages of the prior art by providing an improved anti-ice control system for optimizing the supply of bleed air to structural components to a minimum quantity sufficient to prevent the formation of ice.

SUMMARY OF THE INVENTION

In accordance with the invention, the anti-ice control system comprises a control valve for controlling the flow of heated air along a flow path leading to structural components subject to icing conditions. The control valve is operated by a pneumatic actuator having a diaphragm biased by a reference spring to move the valve to a position closing the flow path to flow of heated air. A reference pressure regulator supplies a control pressure through an orifice to one side of the actuator diaphragm to urge the control valve toward an open position allowing flow of heated air through the flow path. The control pressure is modulated through a nozzle in a servo unit including a servo beam operably positioned with respect to the nozzle by temperature and pressure responsive means to modulate the control pressure in response to a combination of the temperature of the heated air in the flow path, and the temperature of ambient air, and the flow through the control valve. That is, the servo beam operates to open and close the nozzle to modulate the control pressure to decrease upon an increase in the temperature of the heated air in the flow path, and upon an increase in the temperature of the ambient air, whereby the actuator reference spring urges the control valve back toward a closed position to reduce the quantity of heated air supplied to the structural components.

BRIEF DESCRIPTION OF THE DRAWINGS

The accompanying drawings illustrate the invention. In such drawings.

DETAILED DESCRIPTION OF THE PREFERRED EMBODIMENT

Figure 1:
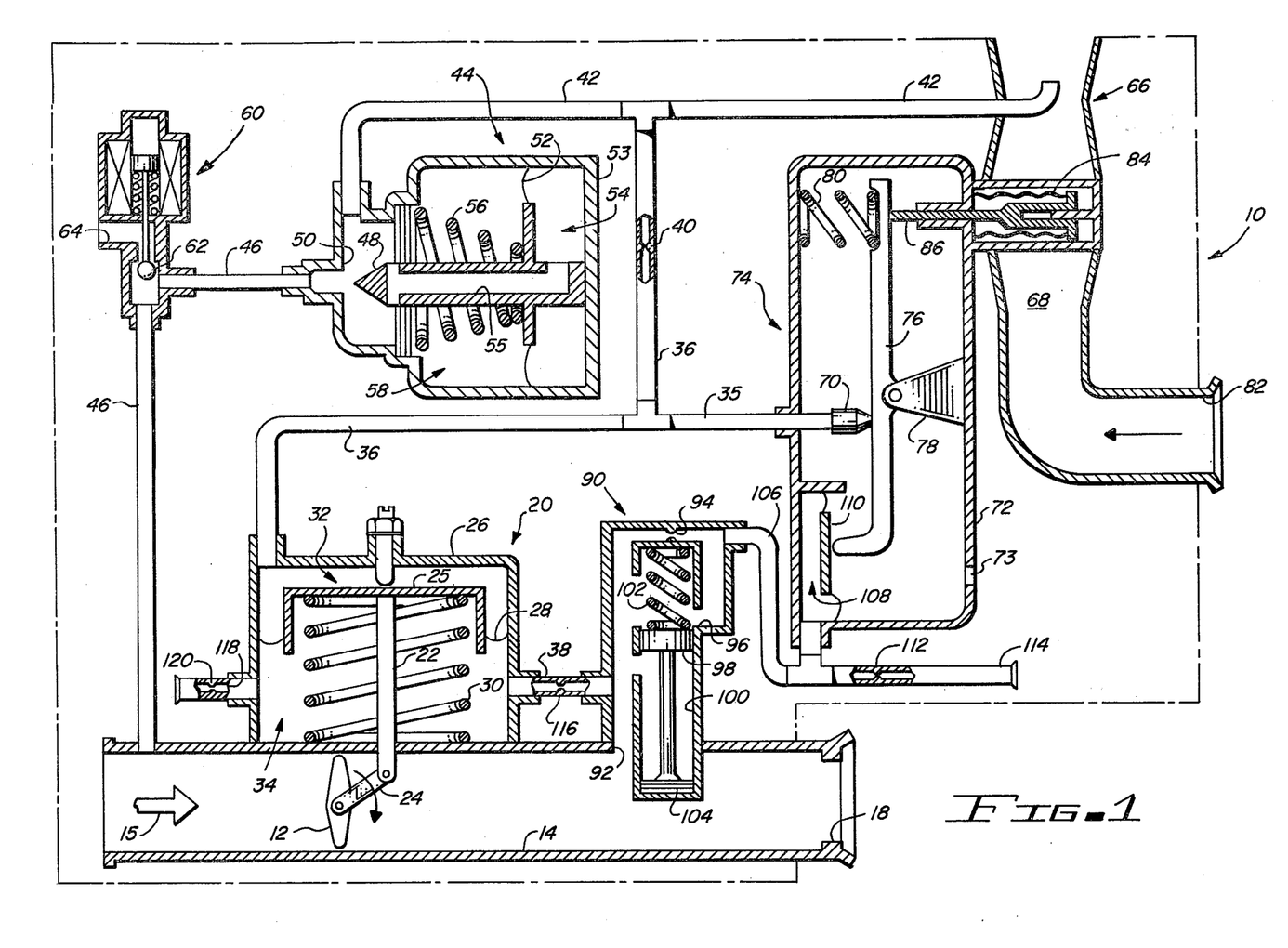
FIG. 1 is a schematic diagram of the anti-ice control system.

The anti-ice control system 10 of this invention is shown generally in FIG. 1, and comprises a control valve 12 such as a butterfly valve or the like mounted along a conduit or flow path 14 through which heated air passes in the direction of arrow 15 to structural components (not shown) for preventing icing of those structural components. Typically, the heated air is taken from a suitable source (not shown) such as bleed air from the engine compressors of a turbine engine powered aircraft. As shown, the flow path 14 includes a flow metering orifice 18 downstream of the control system 10 and control valve 12 for metering the flow of the heated bleed air to the structural components, and for providing a back pressure on the valve 12 which is functionally related to the flow of heated air to the structural components.

The control valve 12 is positioned by a pneumatic actuator 20 to modulate the quantity of heated air supplied to the structural components in response to the temperature of the heated air, and in response to the temperature of ambient air. More specifically, as shown, the actuator 20 includes an actuator rod 22 having one end connected with the control valve 12 by a crank link 24. The opposite end of the actuator rod 22 is coupled for movement with a piston member 25 which is carried within an actuator housing 26 by a flexible diaphragm 28, and which is biased toward an upper position by a reference spring 30 to move the control valve 12 to a normal position closing the flow path 14 to flow of heated air.

The diaphragm 28 and the piston member 25 divide the actuator housing 26 into an upper chamber 32 and a lower chamber 34. The upper chamber 32 is coupled to a control conduit 36 for receiving a modulated control pressure, and the lower chamber 34 is coupled to a feedback conduit 38 for receiving a proportional feedback pressure. These pressures in the chambers 32 and 34 result in a pressure differential applied across the diaphragm 28 and the piston member 25 which, under certain conditions to be hereafter described, is sufficient to overcome the bias of the reference spring 30 to shift the actuator rod 22 to move the valve 12 to an at least partially open position to allow controlled flow of heated air along the flow path.

More specifically, as illustrated in FIG. 1, the control conduit 36 is connected through a pressure reduction orifice 40 to a fixed pressure conduit 42. Fluid pressure is supplied to the fixed pressure conduit 42 via a reference pressure regulator 44 for supplying a fixed pressure from an input conduit 46 coupled to the flow path 14 upstream of the control valve 12. The reference pressure regulator 44 comprises a valve member 48 for seating upon a valve seat 50, and for movement away from the valve seat 50 to reduce the fluid pressure in the conduit 42 to a fixed value. To this end, the valve member 48 is carried by a flexible diaphragm 52 with respect to a housing 53 to define a pressure chamber 54 in communication with the reduced pressure via a passage 55 formed in the valve member 48. A control spring 56 in an atmospheric chamber 58 opposite the pressure chamber 54 opposes the fluid pressure in the pressure chamber 54 to shift the valve member 48 away from the seat 50 to hold the fluid pressure in the conduit 42 to a fixed value. Conveniently, as shown, a solenoid assembly 60 including a two-position ball valve 62 is provided along the input conduit 46 for selectively coupling the reference pressure regulator to atmosphere via a vent 64 when it is desired to disable the anti-ice system of this invention. Moreover, the fixed pressure conduit 42 is exhausted in a downstream direction within the throat portion 66 of an aspirator 68, the function of which will be hereafter described in more detail.

A servo conduit 35 branches from the control conduit 36, and terminates in a servo nozzle 70. The servo nozzle 70 is disposed within the housing 72 of a servo unit 74, wherein the housing 72 is open to atmospheric pressure via a port 73 to prevent pressurization thereof. The servo nozzle 70 contacts a servo beam 76 slightly to one side of a centrally located pivot mount 78. A reference spring 80 engages the opposite end of the servo beam 76, and functions to bias the servo beam 76 toward a position normally closing the servo nozzle 70. Accordingly, during normal operation of the system, the control pressure is communicated to the upper chamber 32 of the pneumatic actuator 20 to shift the control valve 12 to an open position allowing heated air flow along the flow path 14.

The servo unit 74 is positioned in close proximity with the aspirator 68 which includes an ambient air inlet 82 for aspiration flow therethrough of ambient air. A temperature sensing bellows 84 of generally conventional construction, such as a copper bellows filled with a temperature responsive fluid, is disposed along the aspirator flow path, in communication with ambient air while at the same time isolated from ambient moisture which may cause icing. The bellows is coupled with a linearly translatable arm 86 positioned in bearing engagement with the servo beam 76 in force opposition with the reference spring 80. The temperature sensing bellows assembly 84 operates to provide a force output on the arm 86 which increases with increases in ambient air temperature to at least partially overcome the force bias of the reference spring 70. This tends to urge the servo beam 76 away from a position closing the servo nozzle 70. In this manner, with increases in ambient air temperature, a portion of the fluid in the control conduit 36 is bled off into the servo housing 72 to reduce and modulate the fluid pressure level in the upper chamber 32 of the pneumatic actuator 20. This reduction in the control pressure causes the actuator 20 to shift the control valve 12 to a partially closed position to reduce the quantity of heated air flowing through the flow path to the structural components requiring heated air for anti-icing purposes. This is consistent with optimum heated air requirements since the need for hot anti-ice air flow decreases with increases in ambient air temperature.

A heated air temperature sensor assembly 90 is positioned along the flow path 14 downstream of the control valve 12, and is coupled with the servo unit 74 to further modulate the control pressure in the conduit 36 in response to the temperature of the heated air actually supplied to the structural components. As shown, the heated air temperature sensor assembly 90 includes an inlet 92 communicating with the heated air downstream of the control valve 12. The inlet 92 communicates the heated air to a fixed orifice 94 and a scaling orifice 96 positioned in parallel flow relation with respect to each other. A piston 98 is slidable in a piston guide 100 to variably close the scaling orifice 96, and is normally biased to a position opening the scaling orifice as by a spring 102. A stack of temperature sensitive disks 104 are received in the piston guide 100, and retract upon increases in the temperature of the heated air to displace the piston 98 downwardly in direct portion to the temperature increase. Such movement of the piston 98 partially closes the scaling orifice 96 to decrease the pressure drop across the fixed and scaling orifices 94 and 96, and thereby also increase the fluid pressure level in an output conduit 106 in direct proportion to the temperature of the heated air in the flow path 14.

The proportional pressure in output conduit 106 is applied to a pressure chamber 108 in the servo unit 74 for communication with flexible diaphragm means 110. The diaphragm means 110 bearingly engages one end of the servo beam 76, and functions according to the level of proportional pressure in the chamber 108 to partially overcome the bias of the reference spring 80. In this manner, increases in pressure in the chamber 108 which occur directly as a result of increases in the temperature of the heated air cause a further bleeding off of pressure via the control nozzle 70 to further reduce the pressure level in the actuator pressure chamber 32. Thus, the further reduction of pressure in the chamber 32 causes a further closing of the control valve 12 to reduce further the quantity of heated air supplied to the structural components. Conveniently, as shown, fluid in the output conduit 106 is exhausted ultimately to atmosphere through a downstream orifice 112 in an exhaust conduit 114.

Feedback control for the pneumatic actuator 20 is provided by means of the feedback conduit 38 coupled between the heated air inlet 92 and the lower chamber 34 of the actuator. The feedback conduit 38 includes a pressure reduction orifice 116 which supplies the actuator with a feedback pressure proportional to the heated air quantitative flow. In this manner, as the pressure of the heated air increases, the pressure within the upper chamber 32 is at least partially offset to urge the control valve 12 toward a more closed position. Moreover, in the event of failure of the servo unit 74, the feedback pressure communicated with the diaphragm 28 limits the maximum available flow of heated air past the control valve 12. Conveniently, an exhaust conduit 118 exhausts the lower chamber 34 through an exhaust orifice 120.

Figures 2, 2A:
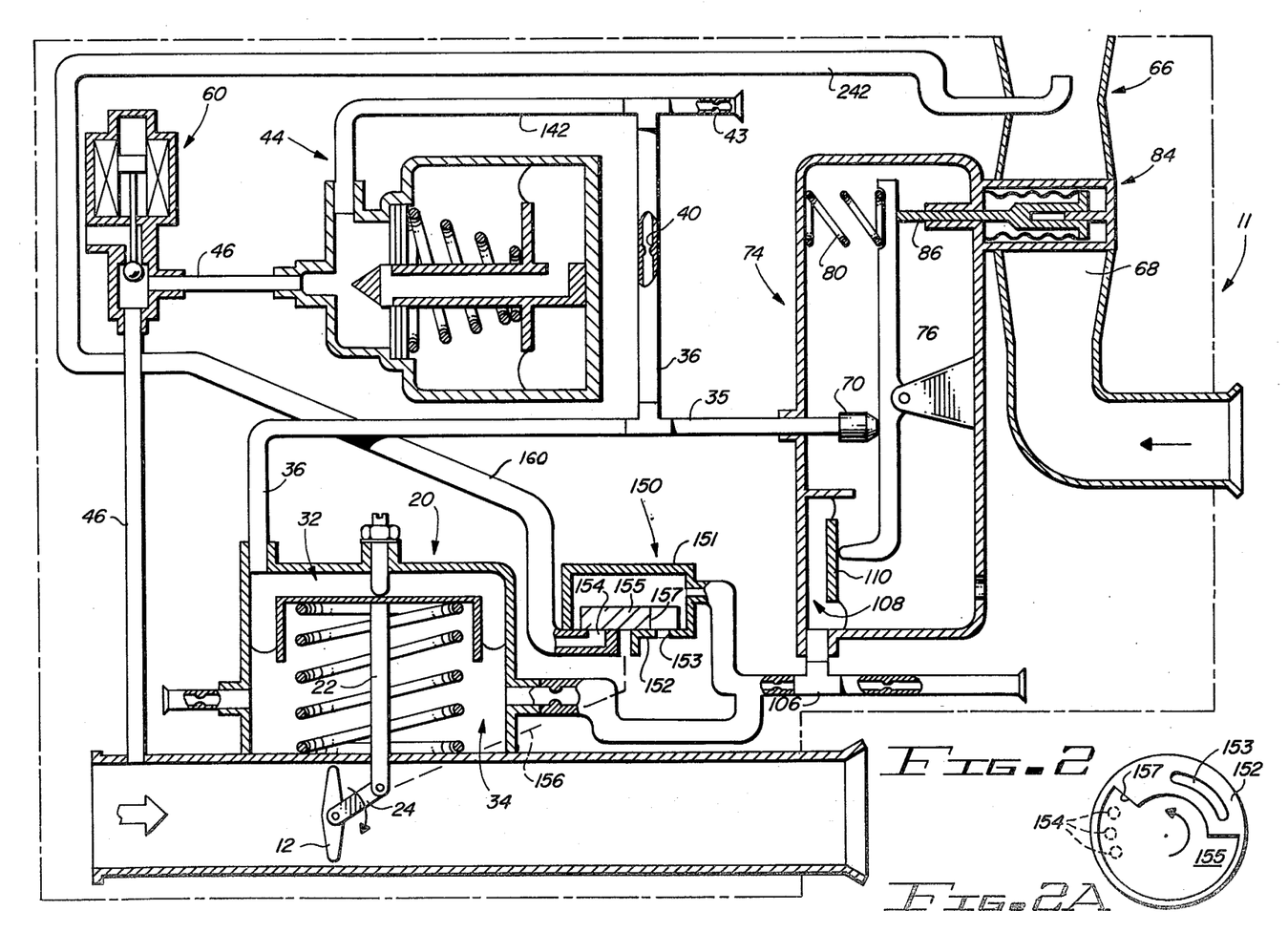
FIG. 2 is a schematic diagram of an alternate anti-ice control system and FIG. 2A is an enlarged top plan view illustrating a portion of the system of FIG. 2.

An alternate embodiment of the invention is illustrated in FIG. 2, wherein components common with the embodiment of FIG. 1 are identified by like reference numerals. This embodiment does not require back pressurization of the control valve 12 for operation of means responsive to the temperature of the heated air, and thereby is particularly suited for applications where minimum system inlet pressure is available. In the embodiment of FIG. 2, the control system 11 includes a solenoid valve assembly 60 for coupling the heated air to a reference pressure regulator 44 via an input conduit 46. The regulator 44 provides a fixed fluid pressure to a fixed pressure conduit 142 which is exhausted to atmosphere through an orifice 43. A control pressure conduit 36 is connected to the fixed pressure conduit 142, and includes an orifice 40 for supplying a control pressure to an upper chamber 32 of a pneumatic actuator 20. As in the embodiment of FIG. 1, the actuator 20 responds to the pressure level of the control pressure to move an actuator rod 22 and a crank link 24 to control the position of a control valve 12 in the flow path 14.

The pressure level of the control pressure in the control conduit 36 is adjusted according to the temperature of the heated air, and the temperature of the ambient air. More specifically, in this embodiment, the control pressure is modulated in response to the temperature of the ambient air generally in the same manner as in the embodiment of FIG. 1. That is, a servo conduit 35 couples the control pressure to the servo unit 74 by means of the servo nozzle 70. The servo beam 76 is force adjusted with respect to the nozzle 70 by a reference spring 80 and a temperature sensitive bellows assembly 84 including an actuator arm 86 acting in opposition to the reference spring 80. Importantly, the bellows assembly 84 is positioned along the length of an aspirator 68 to isolate the assembly from ambient moisture. However, in this embodiment, an aspirator conduit 242 is connected to the input conduit 46 upstream of the solenoid valve assembly 60, and discharges the relative high pressure therein in a downstream direction within the throat portion 66 of the aspirator. In this manner, substantial ambient air flow is induced through the aspirator in communication with the temperature sensitive bellows assembly 84.

A variable orifice unit 150 is provided for adjusting the position of the servo beam 76 is response to the temperature of the heated air supplied to the structural components. As shown, the variable orifice unit comprises a housing 151 having a lower plate 152 with an arcuate slot 153 and a series of arcuately spaced holes 154 formed therein. A control disk 155 is positioned within the housing 151 in sliding relation with the plate 152 for covering the slot 153 and holes 154. Importantly, the disk 155 is mechanically rotated by movement of the control valve 12, as illustrated by the dashed line 156 in FIG. 2. However, since a variety of relatively conventional and direct mechanical couplings are countemplated, no specific coupling construction is shown or described.

The disk 155 is rotated within the housing 151 upon movement of the control valve in response to the control pressure, which in turn is modulated in response to the temperature of the ambient air. With a given engine, the temperature of the heated air in the flow path 14 is a known function of the pressure of the heated air. Accordingly, in this embodiment, the heated air pressure within the input conduit 46 is coupled to the housing 151 by a supply conduit 160 connected for passage of the heated air through the arcuately spaced holes 154. Importantly, the disk 155 includes a cut-out portion 157 for uncovering part or all of the holes 154 depending upon the position of disk rotation. Thus, the holes 154 comprise a variable orifice for providing a reduced pressure level within the housing 151. The housing 151 is exhausted via the slot 153, which also comprises a variable orifice which is progressively covered upon disk rotation.

The pressure level within the housing 151 comprises a known pressure level functionally related to the temperature and pressure of the heated air in the flow path, according to the orifice ratio of the spaced holes 154 with respect to the slot 153 and position of disk rotation. The pressure level is communicated by the conduit 106 to the pressure chamber 108 and the diaphragm means 110 of the servo unit 74 to further modulate the control pressure in response to the temperature of the heated air. Moreover, this pressure level is communicated to the lower chamber 34 of the pneumatic actuator 20 via the feedback conduit 38 for feedback control purposes similar to the embodiment of FIG. 1.

The invention of this application thus comprises an anti-ice control system for optimizing the quantity of heated air supplied to structural components for anti-icing purposes. The system minimizes the flow of heated air by responding both to the temperature of the ambient air, and to the temperature of the heated air.

A variety of modifications and improvements to the anti-ice control system described herein are believed to be possible without varying from the scope of the invention. For example, the relative sizes and positions of the various orifices described herein may be altered as desired for any given pressure-temperature function and system parameters. Accordingly, no limitation on the invention is intended by way of the description, except as set forth in the appended claims.

What is claimed is:

1. A variable volume control system for controlling the flow rate of a heated fluid through supply conduit means, comprising a control valve movable between positions opening and closing the supply conduit means to fluid flow for modulating the flow rate therethrough; a pressure responsive pneumatic actuator for movably positioning said control valve; and means for supplying a pneumatic fluid pressure control signal to said actuator, said control signal supplying means including means for modulating the control signal in response to the temperature of ambient air, and in response to the temperature of the heated fluid within the supply conduit means, said control signal supplying means further including a reference pressure regulator, an input conduit connected between said regulator and the supply conduit means at a point upstream of said control valve, and output conduit means connected between said regulator and said actuator, said regulator including means responsive to fluid pressure in said input conduit to supply a predetermined control pressure to said actuator via said output conduit means said output conduit means comprising an output conduit connected from said regulator to atmosphere, and a control conduit including orifice means connected between said output conduit and said regulator.

2. A variable volume control system for controlling the flow rate of a heated fluid through supply conduit means, comprising:

(a) a control valve movable between positions opening and closing the supply conduit means to fluid flow for modulating the flow rate therethrough;
(b) a pressure responsive pneumatic actuator for movably positioning said control valve; and
(c) means for supplying a pneumatic fluid pressure control signal to said actuator, said control signal supplying means including means for modulating the control signal in response to the temperature of the heated fluid within the supply conduit means, said control signal modulating means comprising:
  (1) a servo unit;
  (2) servo conduit means for supplying the control signal to said servo unit, said servo unit including adjustment means for adjustably opening and closing said servo conduit means to fluid flow;
  (3) means responsive to the temperature of ambient air and coupled to said adjustment means for variably positioning said adjustment means in response to ambient air temperature; and
  (4) means responsive to the temperature of the heated fluid and coupled to said adjustment means for variably positioning said adjustment means in response to the temperature of the heated fluid,
  said servo conduit means including a servo conduit for supplying the control pressure to said servo unit in parallel with said actuator, said servo conduit terminating in a nozzle within said servo unit,
  said adjustment means including a pivotally mounted servo beam for variably opening and closing said nozzle, and reference spring means for predeterminably biasing said beam toward a position closing said nozzle,
  said ambient air temperature responsive positioning means comprising a temperature sensing bellows assembly disposed in communication with ambient air, said bellows assembly including a force arm in bearing engagement with said beam in force-opposition to said reference spring means for providing a force to said beam as a function of increasing ambient air temperature for moving said beam away from said nozzle to modulate the pressure level of the control signal.

3. The system as set forth in claim 2 wherein said temperature sensing bellows assembly is disposed along means forming an ambient air aspirator, and including flow means for drawing ambient air through said aspirator.

4. The system as set forth in claim 3 wherein said flow means comprises means coupled between the supply conduit means upstream of said control valve and said aspirator for drawing ambient air flow through said aspirator.

5. The system as set forth in claim 2 wherein said heated fluid temperature responsive means comprises pressure responsive positioning means in bearing engagement with said servo beam, heated fluid conduit means coupled between the pressure responsive means and the supply conduit means and variable orifice means along said heated fluid conduit means for supplying a fluid pressure to said pressure responsive means which is modulated as a function of the temperature of the heated fluid for urging said pressure responsive means and said servo beam in force-opposition to said reference spring as a function of increasing heated fluid temperature for moving said servo beam away from said nozzle for modulating the pressure level of the control signal.

6. The system as set forth in claim 5 wherein said heated fluid conduit means is coupled between the pressure responsive means and the supply conduit means downstream of the control valve.

7. The system as set forth in claim 5 wherein said heated fluid conduit means is coupled between the pressure responsive means and the supply conduit means upstream of said control valve.

8. The system as set forth in claim 7 wherein said variable orifice means comprises a variable orifice housing disposed along said heated fluid conduit means and including a fluid pressure inlet and a fluid pressure outlet coupled to said heated fluid conduit means, and an ambient outlet, and flow control means connected with said control valve for movement therewith for controllably varying the flow areas of said fluid inlet and ambient outlet generally inversely to each other so that the fluid pressure within said housing and communicated to said pressure responsive means via said fluid outlet comprises a predetermined function of the pressure of the heated fluid in the supply conduit means.

9. The system as set forth in claim 6 wherein said variable orifice means comprises a piston member disposed along said heated fluid conduit means, and a plurality of temperature sensitive disks in temperature communication with the heated fluid in the supply conduit means and in bearing engagement with said piston member for movably positioning said piston member for varying the available flow area of said heated fluid conduit means to define a temperature responsive variable orifice, whereby the fluid pressure supplied to said pressure responsive means comprises a pressure modulated in response to the temperature of the heated fluid.

10. The system as set forth in claim 2 including means for supplying a feedback signal to said actuator in force-opposition to the control signal for limiting the maximum flow of the heated fluid through the supply conduit means, said feedback signal being proportional to the pressure of the heated fluid in the supply conduit means.

11. An anti-ice control system for controlling the flow rate of a heated fluid through a flow path for supply to components subject to icing, comprising:
(a) a control valve operably positioned along the flow path for modulating the flow rate of heated fluid therethrough;
(b) a pressure responsive actuator coupled to said control valve for modulating said control valve;
(c) a servo unit;
(d) means for supplying in parallel to said actuator and said servo unit a control pressure signal functionally related to the pressure of the heated fluid in the flow path, and servo unit including adjustment means for bleeding off a portion of the control pressure signal to modulate the pressure level thereof, said signal supplying means including a nozzle within said servo unit, said adjustment means comprising a pivotally mounted servo beam for variably opening and closing said nozzle, and reference spring means for predeterminably biasing said beam toward a position closing said nozzle;
(e) means responsive to the temperature of ambient air and coupled to said adjustment means for variably positioning said adjustment means in response to ambient air temperature, said ambient air temperature responsive means comprising a temperature sensing bellows assembly disposed in communication with ambient air, said bellows assembly including a force arm in bearing engagement with said beam in force-opposition to said reference spring means for providing a force to said beam as a function of increasing ambient air temperature to move said beam away from said nozzle for modulating the pressure level of the control signal; and (f) means responsive to the temperature of the heated fluid and coupled to said adjustment means for variably positioning said adjustment means in response to the temperature of the heated fluid.

12. The system as set forth in claim 11 wherein said temperature sensing bellows assembly is disposed along means forming an ambient air aspirator, and including flow means for drawing ambient air through said aspirator.

13. The system as set forth in claim 12 wherein said flow means comprises means coupled between the flow path upstream of said control valve and said aspirator for drawing ambient air flow through said aspirator.

14. The system as set forth in claim 11 wherein said heated fluid temperature responsive means comprises pressure responsive means in bearing engagement with said servo beam, heated fluid conduit means coupled between the pressure responsive means and the flow path, and variable orifice means along said heated fluid conduit means for supplying a fluid pressure to said pressure responsive means which is modulated as a function of the temperature of the heated fluid for urging said pressure responsive means and said servo beam in force-opposition to said reference spring as a function of increasing heated fluid temperature for moving said servo beam away from said nozzle for modulating the pressure level of the control signal.

15. The system as set forth in claim 14 wherein said heated fluid conduit means is coupled between the pressure responsive means and the flow path downstream of said control valve, and wherein said variable orifice means comprises a piston member disposed along said heated fluid conduit means, and a plurality of temperature sensitive disks in temperature communication with the heated fluid in the flow path and in bearing engagement with said piston member for movably positioning said piston member for varying the available flow area of said heated fluid conduit means to define a temperature responsive variable orifice, whereby the fluid pressure supplied to said pressure responsive means comprises a pressure modulated in response to the temperature of the heated fluid.

16. The system as set forth in claim 14 wherein said heated fluid conduit means is coupled between the pressure responsive means and the flow path upstream of said control valve, and wherein said variable orifice means comprises a variable orifice housing disposed along said heated fluid conduit means and including a fluid pressure inlet and a fluid pressure outlet coupled to said heated fluid conduit means, and an ambient outlet, and flow control means connected with said control valve for movement therewith for controllably varying the flow areas of said fluid inlet and ambient outlet generally inversely to each other so that the fluid pressure within said housing and communicated to said pressure responsive means via said fluid outlet comprises a predetermined function of the pressure of the heated fluid in the flow path.

17. An anti-ice control system for controlling the flow rate of a heated fluid through a flow path for supply to components subject to icing, comprising a control valve operably positioned along the flow path for controlling the flow rate of heated fluid therethrough; an actuator coupled to said control valve for movably positioning said valve, said actuator including an actuator housing, a diaphragm mounted within said actuator housing for pressure responsive movement, and means connected between said diaphragm and said control valve for positionally adjusting said control valve upon pressure responsive movement of said diaphragm; a reference pressure regulator coupled between said actuator and the flow path upstream of said control valve for supplying a control pressure signal to said actuator for communication with said diaphragm; an ambient air aspirator, said regulator including flow output means coupled to said aspirator for drawing ambient air flow through said aspirator; a servo unit; means including a nozzle within said servo unit for passage of the control pressure signal into said servo unit, said servo unit including a pivotally mounted servo beam for variably opening and closing said nozzle, and reference spring means for predeterminably biasing said beam toward a position closing said nozzle; means responsive to ambient air temperature disposed along said aspirator and including a force arm in bearing engagement with said servo beam in force-opposition to said reference spring for providing a force to said beam as a function of increasing ambient air temperature for moving said beam away from said nozzle for modulating the pressure level of the control signal; and means responsive to the temperature of the heated fluid including pressure responsive means in bearing engagement with said servo beam, heated fluid conduit means coupled between the flow path downstream of said control valve and said pressure responsive means, and variable orifice means along said heated fluid conduit means and responsive to the temperature of the heated fluid in the flow path for varying the available flow area therethrough for supplying a fluid pressure to said pressure responsive means which is modulated as a function of heated fluid temperature for urging said pressure responsive means and said servo beam in force-opposition to said reference spring as a function of increasing heated fluid temperature for moving said servo beam away from said nozzle for modulating the pressure level of the control signal.

18. The system as set forth in claim 17 wherein said variable orifice means comprises a piston member disposed along said heated fluid conduit means, and a plurality of temperature sensitive disks in temperature communication with the heated fluid in the flow path and in bearing engagement with said piston member for movably positioning said piston member for varying the available flow area of said heated fluid conduit means to define a temperature responsive variable orifice, whereby the fluid pressure supplied to said pressure responsive means comprises a pressure modulated in response to the temperature of the heated fluid.

19. An anti-ice control system for controlling the flow rate of a heated fluid through a flow path for supply to components subject to icing, comprising a control valve operably positioned along the flow path for controlling the flow rate of heated fluid therethrough; an actuator coupled to said control valve for movably positioning said valve, said actuator including an actuator housing, a diaphragm mounted within said actuator housing for pressure responsive movement, and means connected between said diaphragm and said control valve for positionally adjusting said control valve upon pressure responsive movement of said diaphragm; a reference pressure regulator coupled between said actuator and the flow path upstream of said control valve for supplying a control pressure signal to said actuator for communication with said diaphragm; an ambient air aspirator, said regulator including flow output means coupled to said aspirator for drawing ambient air flow through said aspirator; a servo unit; means including a nozzle within said servo unit for passage of the control pressure signal into said servo unit, said servo unit including a pivotally mounted servo beam for variably opening and closing said nozzle, and reference spring means for predeterminably biasing said beam toward a position closing said nozzle; means responsive to ambient air temperature disposed along said aspirator and including a force arm in bearing engagement with said servo beam in force-opposition to said reference spring for providing a force to said beam as a function of increasing ambient air temperature for moving said beam away from said nozzle for modulating the pressure level of the control signal; and means responsive to the temperature of the heated fluid including pressure responsive means in bearing engagement with said servo beam, heated fluid conduit means coupled between the flow path upstream of said control valve and said pressure responsive means, and variable orifice means along said heated fluid conduit means and responsive to the pressure of the heated fluid in the flow path for supplying a modulated fluid pressure to said pressure responsive means for urging said pressure responsive means and said servo beam in force-opposition to said reference spring as a function of increasing heated fluid temperature for moving said servo beam away from said nozzle for modulating the pressure level of the control signal, said variable orifice means comprising a variable orifice housing disposed along said heated fluid conduit means and including a fluid pressure inlet and a fluid pressure outlet coupled to said heated fluid conduit means, and an ambient outlet, and flow control means connected with said control valve for movement therewith for controllably varying the flow areas of said fluid inlet and ambient outlet generally inversely to each other so that the fluid pressure within said housing and communicated to said pressure responsive means via said fluid outlet comprises a predetermined function of the pressure of the heated fluid in the flow path.

20. The system as set forth in claim 17 or 19 wherein said means connected between said diaphragm and said control valve is operable to move said control valve toward a position closing the flow path with decreases in the pressure level of the control pressure signal.

21. The system as set forth in claim 8 or 16 or 19 wherein said housing includes therein at least one arcuately formed opening forming said fluid inlet, and at least one arcuately formed opening forming said ambient outlet, said flow control means comprising a disk member having a radially enlarged arcuate section sized for covering said fluid inlet and ambient outlet, and means for connecting said disk for movement with said control valve for controllably and partially covering and uncovering the fluid inlet and ambient outlet to vary their open flow areas generally inversely to each other.

22. The system as set forth in claim 17 or 19 wherein said ambient air temperature responsive means includes a temperature sensing bellows.

23. The system as set forth in claim 17 or 19 including means for supplying a feedback signal to said actuator in force-opposition to the control signal for limiting the maximum flow of heated fluid through the flow path, said feedback signal being proportional to the pressure of the heated fluid in the flow path.

24. A method of controlling the flow rate of a heated fluid through supply conduit means to components subject to icing, comprising the steps of:
(a) positioning valve means in the supply conduit means, said valve means being operable to modulate the flow rate of heated fluid through the supply conduit to the components;
(b) sensing the pressure level within the supply conduit means and responsively generating a first control signal indicative of the sensed pressure level;
(c) sensing the temperature of the heated fluid within the supply conduit means and responsively generating a second control signal indicative of the sensed heated fluid temperature;
(d) sensing ambient temperature and responsively generating a third control signal indicative of a sensed ambient temperature; and
(e) simultaneously utilizing said first, second, and third control signals to operate said valve means.

25. A method of controlling the flow rate of a heated fluid through supply conduit means, comprising the steps of:
(a) positioning a control valve movable between positions opening and closing the supply conduit means to fluid flow to modulate the fluid flow rate therethrough;
(b) movably positioning the control valve with an actuator;
(c) supplying a control signal to the actuator for controlling the position of the control valve, said control signal supplying step including supplying the control signal in parallel to the actuator and to a servo unit via a nozzle, said servo unit including a servo beam for adjustably opening and closing the nozzle to bleed off a portion of the control signal for modulation of the control signal;
(d) modulating the control signal in response to the temperature of ambient air;
(e) modulating the control signal in response to the temperature of the heated fluid within the supply conduit means, said modulating steps comprising adjustably positioning the servo beam with respect to the nozzle respectively in response to the temperature of ambient air and the temperature of the heated fluid in the supply conduit means; and
(f) connecting a reference pressure regulator to the supply conduit means upstream of the control valve for responding to the pressure of the heated fluid for supplying a control pressure via output means to the actuator.

26. The method of claim 25 including the step of biasing the servo beam with a reference spring toward a position closing the nozzle.

27. The method of claim 26 wherein said ambient air temperature modulating step comprises sensing ambient air temperature with a temperature sensing bellows positioned in an ambient air aspirator, applying a force representative of ambient air temperature from the bellows to a force arm, and urging the servo beam with the force arm in force-opposition to the reference spring toward a position away from the nozzle to bleed off a portion of the control signal and thereby modulate the control signal in response to ambient air temperature.

28. The method of claim 27 including connecting the reference pressure regulator output means with the aspirator for drawing ambient air flow through the aspirator.

29. The method of claim 26 wherein said heated fluid modulating step comprises positioning pressure responsive means in bearing engagement with the servo beam, coupling heated fluid conduit means between the supply conduit means and the pressure responsive means, and variably orificing heated fluid flow through the heated fluid conduit means as a function of heated fluid temperature for urging the pressure responsive means against the servo beam in force-opposition to the reference spring for urging the beam away from the nozzle to bleed off a portion of the control signal and thereby modulate the control signal in response to the temperature of the heated fluid.

30. The method of claim 29 wherein said variably orificing step comprises sensing the heated fluid temperature by means of a plurality of temperature sensitive disks in temperature communication with the heated fluid in the supply conduit means downstream of the control valve, and variably moving a piston member with the disks in response to heated fluid temperature for variably opening and closing the heated fluid conduit means.

31. The method of claim 25 including the step of supplying a feedback signal to the actuator in force-opposition to the control signal for limiting the maximum flow of heated fluid through the supply conduit means, said feedback signal being proportional to the pressure of the heated fluid in the supply conduit means.

32. The method of claim 29 including connecting the heated fluid conduit means between the pressure responsive means and the supply conduit means at a point upstream of the control valve, said variably orificing step comprising connecting an orifice housing along the heated fluid conduit means, said orifice housing having an inlet and an outlet coupled to the heated fluid conduit means, and an ambient outlet and flow control means for variably changing the flow areas of the inlet and the outlet to provide a modulated fluid pressure responsive means, and connecting the flow control means with the control valve for movement therewith whereby the fluid pressure supplied to the pressure responsive means comprises a predetermined function of the pressure of the heated fluid in the supply conduit means.

33. The method of claim 32 including the steps of forming the orifice housing inlet and ambient outlet each to comprise at least one arcuately shaped opening, and forming the flow control means to comprise a disk member with a radially enlarged arcuate section sized to cover the housing inlet and ambient outlet for controllably and partially covering and uncovering the housing inlet and ambient outlet to vary their flow areas generally inversely to each other upon movement of the control valve.

34. A method of controlling the flow rate of a heated fluid through a flow path for supply to components subject to icing, comprising the steps of positioning a control valve movable between positions opening and closing the flow path to fluid flow to control the fluid flow rate through the path; movably positioning the control valve with an actuator; supplying a control signal to the actuator for controlling the position of the control valve, and in parallel therewith to a servo unit via a nozzle; positioning a servo beam for adjustably opening and closing the nozzle for bleeding off a portion of the control signal for modulation thereof; biasing the servo beam with a reference spring toward a position closing the nozzle; modulating the control signal in response to ambient air temperature by providing a force to the servo beam in force-opposition to the reference spring and representative of ambient air temperature for adjustably positioning the servo beam in response to ambient air temperature; and modulating the control signal in response to the heated fluid temperature by providing a force to the servo beam in force-opposition to the reference spring and representative of the temperature of heated fluid in the flow path for adjustably positioning the servo beam in response to heated fluid temperature.

35. The method of claim 34 wherein said ambient air temperature modulating step comprises sensing ambient air temperature with a temperature sensing bellows positioned in an ambient air aspirator, applying a force representative of ambient air temperature from the bellows to a force arm, and urging the servo beam with the force arm in force-opposition to the reference spring toward a position away from the nozzle to bleed off a portion of the control signal and thereby modulate the control signal in response to ambient air temperature.

36. The method of claim 35 including the step of connecting conduit means between the flow path and the aspirator for drawing ambient air flow through the aspirator.

37. The method of claim 34 wherein said heated fluid modulating step comprises positioning pressure responsive means in bearing engagement with the servo beam, coupling heated fluid conduit means between the flow path and the pressure responsive means, and variably orificing heated fluid flow through the heated fluid conduit means as a function of heated fluid temperature for urging the pressure responsive means against the servo beam in force-opposition to the reference spring for urging the beam away from the nozzle to bleed off a portion of the control signal and thereby modulate the control signal in response to the temperature of the heated fluid.

38. The method of claim 37 wherein said variably orificing step comprises sensing the heated fluid temperature by means of a plurality of temperature sensitive disks in temperature communication with the heated fluid in the flow path downstream of the control valve, and variably moving a piston member with the disks in response to heated fluid temperature for variably opening and closing the heated fluid conduit means.

39. The method of claim 34 including the step of supplying a feedback signal to the actuator in force-opposition to the control signal for limiting the maximum flow of heated fluid through the flow path, said feedback signal being proportional to the pressure of the heated fluid in the flow path.

40. The method of claim 37 including connecting the heated fluid conduit means between the pressure responsive means and the flow path at a point upstream of the control valve, said variably orificing step comprising connecting an orifice housing along the heated fluid conduit means, said orifice housing having an inlet and an outlet coupled to the heated fluid conduit means, and an ambient outlet, and flow control means for variably changing the flow areas of the inlet and the outlet to provide a modulated fluid pressure to the pressure responsive means, and connecting the flow control means with the control valve for movement therewith whereby the fluid pressure supplied to the pressure responsive means comprises a predetermined function of the pressure of the heated fluid in the flow path.

41. The method of claim 40 including the steps of forming the orifice housing inlet and ambient outlet each to comprise at least one arcuately shaped opening, and forming the flow control means to comprise a disk member with a radially enlarged arcuate section sized to cover the housing inlet and ambient outlet for controllably and partially covering and uncovering the housing inlet and ambient outlet to vary their flow areas generally inversely to each other upon movement of the control valve.

42. A method of controlling the flow rate of a heated fluid through a flow path for supply to components subject to icing, comprising the steps of positioning a control valve movable between positions opening and closing the flow path to fluid flow to control the fluid flow rate through the path; movably positioning the control valve with an actuator; supplying a control signal to the actuator for controlling the position of the control valve, and in parallel therewith to a servo unit via a nozzle; positioning a servo beam for adjustably opening and closing the nozzle for bleeding off a portion of the control signal for modulation thereof; biasing the servo beam with a reference spring toward a position closing the nozzle; modulating the control signal in response to ambient air temperature by providing a force to the servo beam in force-opposition to the reference spring and representative of ambient air temperature for adjustably positioning the servo beam in response to ambient air temperature, said ambient air temperature modulating step including sensing ambient air temperature with a temperature sensing bellows positioned in an ambient air aspirator, applying a force representative of ambient air temperature from the bellows to a force arm, and urging the servo beam with the force arm in force-opposition to the reference spring toward a position away from the nozzle to bleed off a portion of the control signal and thereby modulate the control signal in response to ambient air temperature; and modulating the control signal in response to the heated fluid temperature by providing a force to the servo beam in force-opposition to the reference spring and representative of the temperature of heated fluid in the flow path for adjustably positioning the servo beam in response to heated fluid temperature, said heated fluid temperature modulating step including positioning pressure responsive means in bearing engagement with the servo beam, coupling heated fluid conduit means between the flow path and the pressure responsive means, and variably orificing heated fluid flow through the heated fluid conduit means as a function of heated fluid temperature for urging the pressure responsive means against the servo beam in force-opposition to the reference spring for urging the beam away from the nozzle to bleed off a portion of the control signal and thereby modulate the control signal in response to the temperature of the heated fluid.

43. The method of claim 42 wherein said variably orificing step comprises sensing the heated fluid temperature by means of a plurality of temperature sensitive disks in temperature communication with the heated fluid in the flow path downstream of the control valve, and variably moving a piston member with the disks in response to heated fluid temperature for variably opening and closing the heated fluid conduit means.

44. A method of controlling the flow rate of a heated fluid through a flow path for supply to components subject to icing, comprising the steps of positioning a control valve movable between positions opening and closing the flow path to fluid flow to control the fluid flow rate through the path; movably positioning the control valve with an actuator; supplying a control signal to the actuator for controlling the position of the control valve, and in parallel therewith to a servo unit via a nozzle; positioning a servo beam for adjustably opening and closing the nozzle for bleeding off a portion of the control signal for modulation thereof; biasing the servo beam with a reference spring toward a position closing the nozzle; modulating the control signal in response to ambient air temperature by providing a force to the servo beam in force-opposition to the reference spring and representative of ambient air temperature for adjustably positioning the servo beam in response to ambient air temperature, said ambient air temperature modulating step including sensing ambient air temperature with a temperature sensing bellows positioned in an ambient air aspirator, applying a force representative of ambient air temperature from the bellows to a force arm, and urging the servo beam with the force arm in force-opposition to the reference spring toward a position away from the nozzle to bleed off a portion of the control signal and thereby modulate the control signal in response to ambient air temperature; and modulating the control signal in response to the heated fluid temperature by providing a force to the servo beam in force-opposition to the reference spring and representative of the temperature of heated fluid in the flow path for adjustably positioning the servo beam in response to heated fluid temperature, said heated fluid temperature modulating step including positioning pressure responsive means in bearing engagement with the servo beam, coupling heated fluid conduit means between the flow path and the pressure responsive means, and variably orificing heated fluid flow through the heated fluid conduit means as a function of heated fluid temperature for urging the pressure responsive means against the servo beam in force-opposition to the reference spring for urging the beam away from the nozzle to bleed off a portion of the control signal and thereby modulate the control signal in response to the temperature of the heated fluid, said variably orificing step comprising connecting an orifice housing along the heated fluid conduit means, said orifice housing having an inlet and an outlet coupled to the heated fluid conduit means, and an ambient outlet, and flow control means for variably changing the flow areas of the inlet and the outlet to provide a modulated fluid pressure to the pressure responsive means, and connecting the flow control means with the control valve for movement therewith whereby the fluid pressure supplied to the pressure responsive means comprises a predetermined function of the pressure of the heated fluid in the flow path.

45. The method of claim 44 including the steps of forming the orifice housing inlet and ambient outlet each to comprise at least one arcuately shaped opening, and forming the flow control means to comprise a disk member with a radially enlarged arcuate section sized to cover the housing inlet and ambient outlet for controllably and partially covering and uncovering the housing inlet and ambient outlet to vary their flow areas generally inversely to each other upon movement of the control valve.

46. Variable volume anti-ice control apparatus comprising:
 (a) supply conduit means for flowing heated fluid from a source thereof to components subject to icing;
 (b) valve means disposed in said supply conduit means and operable to modulate the flow rate of heated fluid to such components;
 (c) first sensing means for sensing the pressure level within said supply conduit means and responsively generating a control signal indicative of the sensed pressure level;
 (d) second sensing means for sensing the temperature of heated fluid within said supply conduit means and responsively generating a control signal indicative of the sensed heated fluid temperature;
 (e) third sensing means for sensing ambient temperature and responsively generating a control signal indicative of the sensed ambient temperature; and
 (f) control means for simultaneously utilizing the control signals from said first, second and third sensing means to operate said valve means.

* * * * *